Patented Jan. 18, 1949

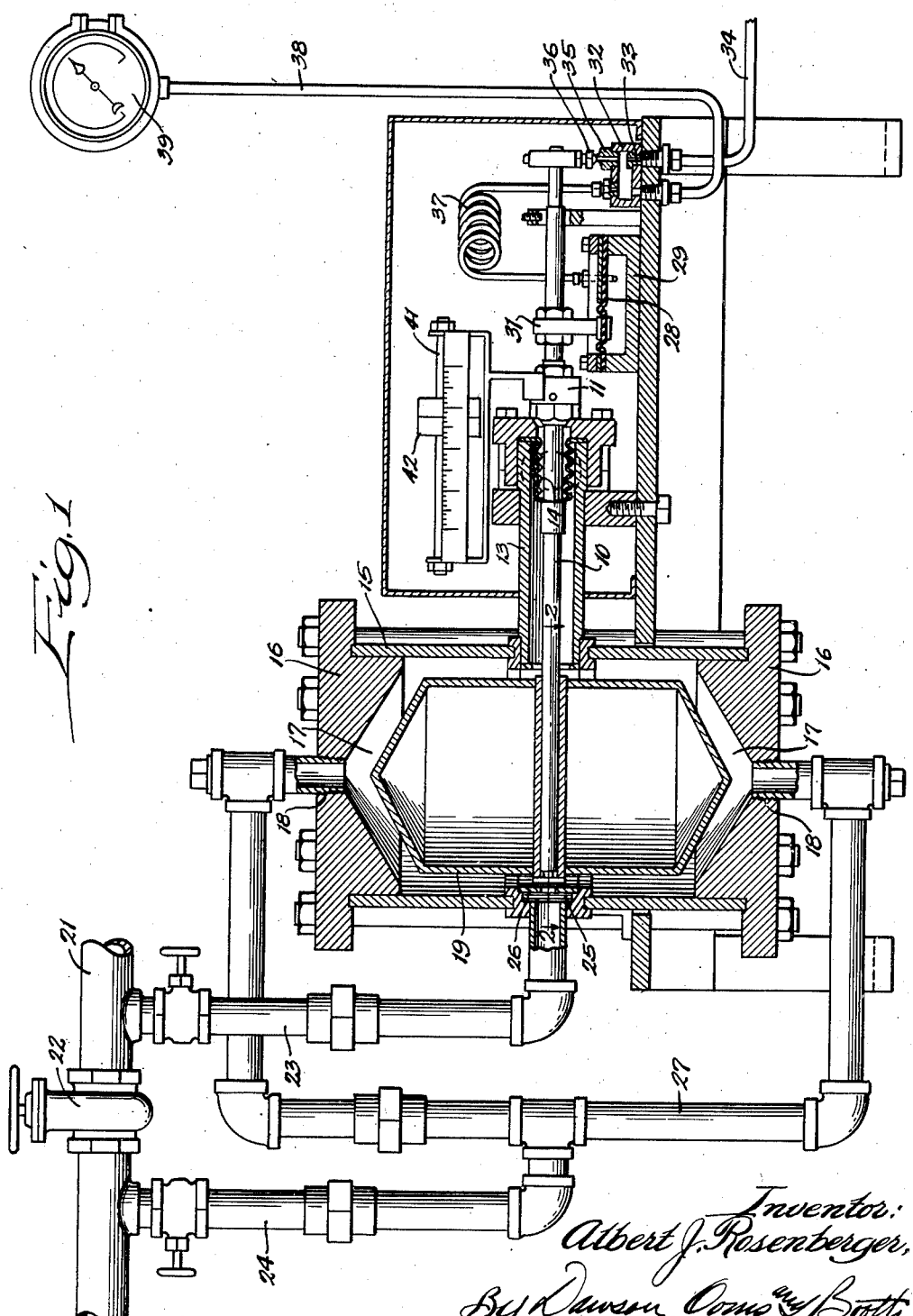

2,459,542

UNITED STATES PATENT OFFICE 2,459,542

DENSITY MEASURING APPARATUS

Albert J. Rosenberger, Chicago, Ill., assignor to Republic Flow Meters Company, Chicago, Ill., a corporation of Illinois Application July 29, 1944, Serial No. 547,114

7 Claims. (Cl. 73—33)

1

This invention relates to density measuring apparatus and more particularly to apparatus for producing a continuous response proportional to the density of a fluid.

One of the objects of the invention is to provide density measuring apparatus in which a continuous indication of density of a flowing fluid is obtained.

Another object of the invention is to provide density measuring apparatus in which the effects of fluid flow on the apparatus are neutralized so that an accurate indication of density is obtained.

Still another object of the invention is to provide density measuring apparatus in which a density responsive member is maintained in substantially the same position regardless of density variations. The density responsive member may be either a displacement member or a container to hold a predetermined volume of fluid.

A still further object of the invention is to provide density measuring apparatus in which fluid flow around a density responsive member is divided to exert equal frictional effects in opposite directions. According to one feature of the invention the opposing flows are through passages whose flow resistances are balanced so that the flows in opposite directions will be equal.

The above and other objects and advantages of the invention will be more readily apparent from the following description when read in connection with the accompanying drawing, in which—

Figure 1 is a sectional view with parts in elevation of one form of apparatus embodying the invention;

Figure 2 is a partial section on the line 2—2 of Figure 1; and

Figure 3 is a partial horizontal section showing the adjustable pivot construction for the beam.

The apparatus shown comprises a balance beam 10 pivoted intermediate its ends. The beam is preferably pivoted in the manner more particularly described and claimed in my Patent No. 2,299,179 by means of a yoke 11 connected to the beam intermediate its ends and straddling a fixed tubular part 13. The ends of the yoke are adjustably pivoted to the outside of the tubular fitting 13 by rotatable plugs 12 eccentrically carrying pivot pins journalled in the part 13 to provide an effective adjustable pivotal axis intersecting the beam within the fitting. A flexible bellows 14 is connected at one end to the beam and at its opposite end to the outer end of the tubular fitting to prevent leakage of fluid around the beam.

One end of the beam projects into a tubular

2 chamber 15 arranged with its axis vertical and rigidly connected to the tubular fitting 13. The ends of the chamber 15 are sealed by cover plates 16 formed on their interior with conical cavities 17 terminating in ports 18. A fluid displacement member 19 generally cylindrical in form with conical end portions is connected to the end of the beam 10 and lies within the chamber 15 with its axis vertical. As shown, the displacement member 19 is hollow and it may be of either greater or less density than the fluid to be measured to exert either an upward or a downward force on the end of the beam. In the arrangement shown the displacement member is of less density than the fluid so that it tends to rise in the fluid and tilt the beam clockwise.

A continuous flow of fluid to be measured is maintained through the chamber 15, as for example, from a conduit 21 through which the fluid is flowing. The conduit may be provided with a restriction shown as a valve 22 having pipe connections 23 and 24 to the opposite sides of the restriction. The pipe 23 opens into an annular passage 25 around the central part of the chamber 15 which is closed by a plate 26 having a series of port openings therein. The conduit 24 is connected to the mid point of a pipe 27 which interconnects the two ports 18 so that flow resistance between the conduit 24 and each of the ports 18 is equal.

In operation fluid may flow in either direction but in either case will divide around the opposite ends of the displacement member 19 to exert an equal frictional effect thereon. Assuming the fluid in the conduit 21 to be flowing to the left the pipe 23 forms the inlet connection and discharges fluid into the annular passage 25. From the passage 25 the fluid flows through the ports in the plate 26 into the chamber 15 and divides, half of the fluid flowing upward along the displacement member 19 and the other half flowing downward. Equal division of the fluid flow is insured by the arrangement of the pipe 27 which provides equal resistance to fluid discharge from each of the ports 18. From the pipe 27 the fluid returns to the conduit 21 through the pipe 24.

The beam 10 is balanced by pressure responsive means shown as a flexible diaphragm 28 closing one side of a chamber 29. The diaphragm is connected to the beam 10 to the right of its pivot by a rod 31 and exerts a tilting force on the beam tending to turn it counter-clockwise to balance the clockwise tilting force of the displacement member 19.

Fluid is supplied to the chamber 29 to urge the diaphragm 28 upwardly by a regulating pressure producing means controlled by the beam 10. This means as shown comprises a valve chamber 32 supplied with fluid under pressure through a restriction 33 and a conduit 34 which may be connected to a compressor or the like. A discharge nozzle 35 communicates with the chamber 32 and is controlled by a valve member 36 connected to the beam 10 and moved by the beam toward and away from the nozzle 35 to vary the pressure in the chamber 32. The chambers 32 and 29 are connected by a conduit 37. The chamber 32 may also communicate through a conduit 38 with measuring or control means indicated as a pressure gauge 39.

The apparatus may be adjusted and calibrated by means including a slide bar 41 rigidly secured to the beam 10 and lying parallel thereto. A weight 42 is slidable on the bar 41 to vary the balance point of the beam. The slide bar 41 extends across the pivotal axis of the beam so that the weight can be moved to either side of the pivot to adjust the apparatus for fluids of different density ranges.

In operation, fluid flowing through the chamber 15 tends to displace the member 19 with a force proportional to the density of the fluid. This exerts a clockwise tilting force on the beam 10 tending to move the valve 36 toward the nozzle 35 to increase the regulated pressure in the chamber 32. This pressure acts on the diaphragm 28 to exert a counter-clockwise tilting force on the beam which balances the force exerted by the displacement member 19. When the forces are equal the beam will be balanced in a neutral position and the regulated pressure as indicated by the meter 38 will be a direct indication of the existing density of the fluid. Since the flow effects on the displacement member are balanced, the flow through the chamber 15 may be as rapid as desired without affecting the operation of the apparatus so that the fluid in the chamber may be replaced rapidly to provide a very rapid response.

The weight 42 provides a simple and convenient means to calibrate the instrument; that is, to change the relationship between density and output pressure. For this purpose the bar 41 carries a scale graduated in terms of density and to calibrate the instrument the chamber 15 may be filled with any convenient fluid whose density need not be known. An output pressure reading may then be taken with the weight in any convenient position such as a density of 1.0. The weight is then shifted a known amount such as 10 percent to 1.1 and a second output pressure reading is taken. If the change in output pressure is not the same in percentage as the shift of the weight 42 the pivots for the beam 10 are adjusted until the change is the same. It will be noted that movement of the weight 42 to indicate increased density will cause a decrease in the output pressure and that for proper calibration the percent change should be equal. Thereafter the range of the instrument; that is, the density change corresponding to full scale deflection of the indicator 39, can be easily adjusted simply by shifting the weight 42 to a position on the scale corresponding to the density desired to produce full scale deflection.

To calibrate the instrument for correct zero setting the chamber 15 is filled with fluid of known density such as distilled water and the weight 42 is set to the corresponding density. If the output pressure does not correspond to this density as indicated on the gage 39 correction may be made by an adjusting weight such as that shown at 51 in Figure 3. The weight 51 is adjustably threaded on a rod 52 carried by the yoke 11 and may be adjusted to balance the beam for zero setting.

While one embodiment of the invention has been shown and described in detail herein, it will be understood that this is illustrative only and is not intended as a definition of the scope of the invention, reference being had for this purpose to the appended claims.

What is claimed is:

1. Density measuring apparatus comprising a pivoted balance beam, a fluid chamber into which one end of the beam extends, a fluid displacement member secured to said one end of the beam and lying in the chamber to exert a tilting force on the beam, pressure responsive means connected to the beam to exert an opposing tilting force thereon, means controlled by tilting of the beam to produce a regulated pressure and connected to the pressure responsive means, means forming a set of ports at the opposite ends of the chamber, means forming a set of ports in the central portion of the chamber, a pipe connecting the ports at the ends of the chamber and having a flow connection at its mid point whereby flow resistance between the flow connection and the end ports will be the same, and a flow connection to the other set of ports, one of the flow connections supplying fluid to the chamber and the other connection discharging fluid therefrom.

2. Density measuring apparatus comprising a pivoted balance beam, a fluid chamber into which one end of the beam extends, a fluid displacement member secured to said one end of the beam and lying in the chamber to exert a tilting force on the beam, pressure responsive means connected to the beam to exert an opposing tilting force thereon, means controlled by tilting of the beam to produce a regulated pressure and connected to the pressure responsive means, means forming a pair of ports at the opposite ends of the chamber, a pipe connecting the ports, a flow connection to the mid point of the pipe whereby the pipe provides equal flow resistance for the ports, means forming an annular passage around the central portion of the chamber having a plurality of ports communicating with the chamber, and a flow connection to the annular passage, one of the flow connections forming a fluid inlet and the other a fluid outlet.

3. Density measuring apparatus comprising a pivoted balance beam, a fluid chamber into which one end of the beam extends, a fluid displacement member secured to said one end of the beam and lying in the chamber to exert a tilting force on the beam, pressure responsive means connected to the beam to exert an opposing tilting force thereon, means controlled by tilting of the beam to produce a regulated pressure and connected to the pressure responsive means, means forming a fluid inlet at the central portion of the chamber, means forming fluid outlet ports at the opposite ends of the chamber whereby fluid from the inlet will flow in opposite directions around the displacement member, and means connected to the outlet ports to equalize the resistance to flow therethrough.

4. Density measuring apparatus comprising a pivoted balance beam, a density responsive member connected to the beam to exert a tilting force thereon, pressure responsive means to exert an opposing tilting force on the beam, means controlled by tilting of the beam to produce a regulated pressure, the pressure responsive means being responsive to the regulated pressure, means for adjusting the pivotal mounting of the beam to shift the effective pivotal axis thereof, and a calibrating weight carried by the beam and adjustable longitudinally thereof.

5. Density measuring apparatus comprising a pivoted balance beam, a density responsive member connected to the beam to exert a tilting force thereon, pressure responsive means to exert an opposing tilting force on the beam, means controlled by tilting of the beam to produce a regulated pressure, the pressure responsive means being responsive to the regulated pressure, means for adjusting the pivotal mounting of the beam to vary the effective pivotal axis thereof, a scale carried by the beam lying substantially parallel thereto and calibrated in terms of density, and a calibrating weight adjustable along the scale.

6. Density measuring apparatus comprising a pivoted balance beam, a density responsive member connected to the beam to exert a tilting force thereon, pressure responsive means to exert an opposing tilting force on the beam, means controlled by tilting of the beam to produce a regulated pressure, the pressure responsive means being responsive to the regulated pressure, means for adjusting the pivotal mounting of the beam to vary the effective pivotal axis thereof, a zero setting weight carried by the beam and adjustable longitudinally thereof to balance the beam for zero setting, and a calibrating weight adjustable longitudinally of the beam to vary the balance of the beam thereby to adjust the range of the instrument.

7. Density measuring apparatus comprising a pivoted balance beam, a density responsive member connected to the beam to exert a tilting force thereon, pressure responsive means to exert an opposing tilting force on the beam, means controlled by tilting of the beam to produce a regulated pressure, the pressure responsive means being responsive to the regulated pressure, means for adjusting the pivotal mounting of the beam to vary the effective pivotal axis thereof, a zero setting weight carried by the beam and adjustable longitudinally thereof to balance the beam for zero setting, an elongated scale carried by the beam substantially parallel thereto and calibrated in terms of density, and a calibrating weight movable along the scale.

ALBERT J. ROSENBERGER.

REFERENCES CITED

The following references are of record in the file of this patent:

UNITED STATES PATENTS

| Number | Name | Date |
|---|---|---|
| 181,099 | Pangburn | Aug. 15, 1876 |
| 380,533 | Siemens | Apr. 3, 1888 |
| 691,437 | Bogue | Jan. 21, 1902 |
| 1,198,869 | Pierce | Sept. 19, 1916 |
| 1,272,605 | Becker | July 16, 1918 |
| 1,384,886 | Brindle | July 19, 1921 |
| 1,575,643 | Salich | Mar. 9, 1926 |
| 1,604,387 | Caldwell | Oct. 26, 1926 |
| 1,838,399 | Hodgson | Dec. 29, 1931 |
| 2,050,629 | Querean et al. | Aug. 11, 1936 |
| 2,145,903 | Tinsley | Feb. 7, 1939 |
| 2,248,322 | Annin | July 8, 1941 |
| 2,299,179 | Rosenberger | Oct. 20, 1942 |
| 2,321,175 | Binckley | June 8, 1943 |

FOREIGN PATENTS

| Number | Country | Date |
|---|---|---|
| 16,192 | Great Britain | 1897 |
| 20,653 | Great Britain | 1905 |

Certificate of Correction

Patent No. 2,459,542                                                                                   January 18, 1949

ALBERT J. ROSENBERGER

It is hereby certified that errors appear in the above numbered patent requiring correction as follows:

In the heading to the drawing, line 3, to the right of "Filed July 29, 1944" insert *2 Sheets—Sheet 1*; and add the following as Sheet 2 of the drawings—

Jan. 18, 1949          A. J. ROSENBERGER          2,459,542
DENSITY MEASURING APPARATUS

Filed July 29, 1944                                                                                   2 Sheets-Sheet 2

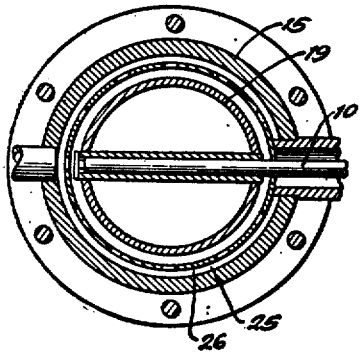

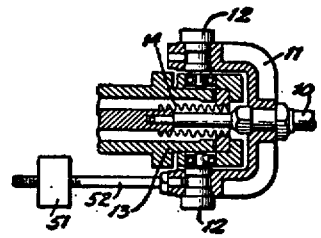

and that the said Letters Patent should be read with these corrections therein that the same may conform to the record of the case in the Patent Office.

Signed and sealed this 8th day of August, A. D. 1950.

[SEAL]

THOMAS F. MURPHY,